Inventors:
Jack C. Acton,
Albert B. Zeissler,
by
Their Attorney.

United States Patent Office 2,749,460
Patented June 5, 1956

2,749,460

MEANS FOR REINFORCING RANDOM WOUND COILS

Jack C. Acton and Albert B. Zeissler, Schenectady, N. Y., assignors to General Electric Company, a corporation of New York Application February 15, 1955, Serial No. 488,262

6 Claims. (Cl. 310—260)

This invention relates to dynamoelectric machines, and more particularly to reinforcing the end turns of random wound stator coils to restrict the movement thereof under severe duty operation.

In the past, electric motors having random wound stator coils which are formed of a plurality of small, round insulated magnet wires have been limited in use to those applications which do not include a severe duty cycle such as frequently starting and stopping under heavy load. Because no satisfactory means for reinforcing the end turns has been available, the relative movement between the various turns in a coil of a random wound motor caused an appreciable deflection of the coil due to the magnetic forces between adjacent turns of the same coil and between adjacent coils. This movement may result in the fracture of the wire due to work-hardening of the copper as a result of its repeated bending over a long period of time. In addition, this movement causes the rubbing of turn insulation and the between phase insulation to result in short circuits as well as the fracture of the varnish coating applied over the stator windings to protect the windings from humidity and other deleterious substances in the air.

This invention contemplates a means for reinforcing the coil end turns of random wound stator coils so that motors having such coils may be used under severe duty conditions.

Therefore, it is an object of this invention to provide means for reinforcing the end turns of the coil which are easy to install and which brace the end turns against movement.

Further objects and advantages of this invention will become apparent and this invention will be better understood from the following description referring to the accompanying drawing, and the features of novelty which characterize this invention will be pointed out with particularity in the claims annexed to and forming part of this specification.

Figure 1:
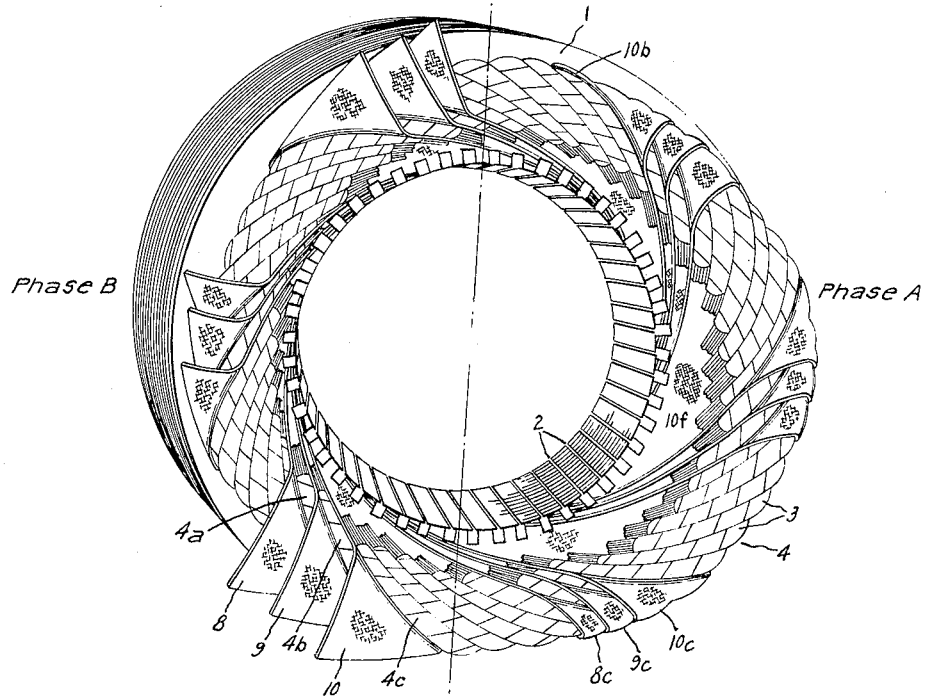

In the drawing, Fig. 1 is a perspective view, partly broken away, of a random wound stator coil for a dynamoelectric machine illustrating one form of this invention.

Figure 2:
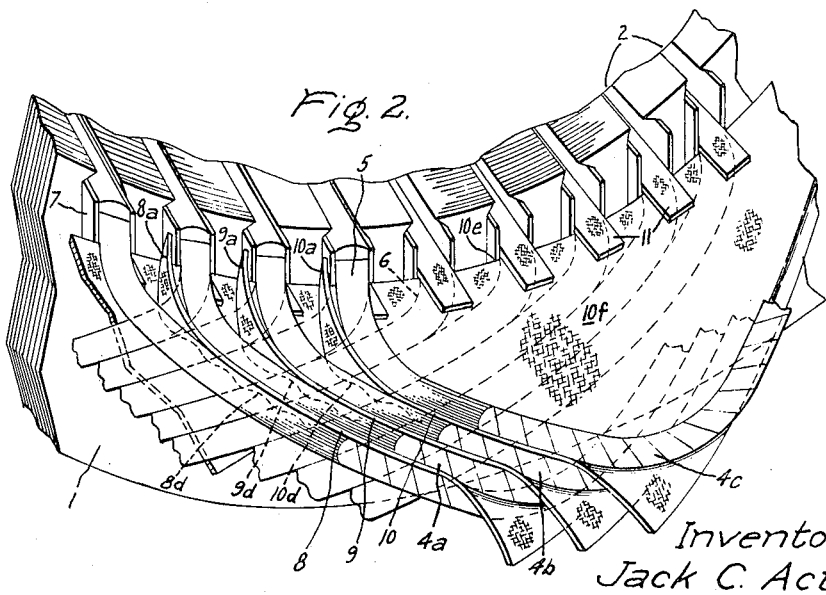

Fig. 2 is a fragmentary perspective view of a dynamoelectric machine similar to Fig. 1 illustrating one modification of this invention.

In accordance with the illustrated embodiment of this invention a plurality of triangular shaped glass cloths which are impregnated with the thermosetting resinous material are interleaved between the end turns of adjacent coils of the different phases of the multiphase winding of the stator for a dynamoelectric machine. One edge of each impregnated cloth is positioned adjacent the end of the stator laminations. The opposite corner of the triangular glass cloth is extended axially from the stator core between the coils and is laid over the outer edge of the coils. Each of the cloths between the coil end turns of the motor overlap at their axially extending corner and over a large area at the central portion of the cloths, so that during the curing of the resin they are bonded together. Since the material, when installed, is flexible and the end turns of the various random wound coils are nested between the end turns of adjacent coils, the glass cloth upon curing becomes a corrugated or dimpled element locked between the layers of end turns. Because of this locking action and the rigidity of the cloth after curing, there is provided a longitudinally extending brace which supports the end turns of the coil against movement under magnetic forces.

Referring now to the drawings, there is shown a stator assembly for a dynamoelectric machine including a core 1 having winding slots 2 therein in which random wound coils 3 formed of a plurality of insulated magnet wire which is normally approximately .030"–.070" in diameter. Each of the coils, indicated generally at 4, has a top coil side 5 and a bottom coil side 6 disposed in the winding slots in a usual manner and insulated therefrom by slot liner 7 which is formed of an insulating material. As shown, the stator is wound with a three-phase coil which is connected to a suitable source of power (not shown) in the usual manner.

The arrangement now to be described illustrates one embodiment of this invention which will best be understood by reference to Fig. 1 in which the sector on the righthand side of the center line and identified as phase A illustrates the present invention after the thermosetting resinous material of the reinforcing means has been cured while the lefthand sector of Fig. 1, and identified as phase B, shows the reinforcing means after it has been installed in the windings but prior to the curing of the resinous material.

In order to provide means for reinforcing the coil end turns, a plurality of pieces of woven triangular shaped cloth 8, 9 and 10 are shown as being inserted between the top and bottom sides of the end turns 4a, 4b and 4c, respectively, of the different phases of the multiphase winding with one edge thereof positioned against the end of the slot liner insulation 7 as indicated at 10e. With the cloths 8, 9 and 10 positioned in this manner, it will be apparent (see Fig. 2) that the cloths 8, 9 and 10 contact each other over a larger area 10f between the top and bottom coil sides. One edge of each glass cloth is turned inwardly to separate the coil end turns 4a, 4b and 4c of the different phases as indicated at 8a, 9a and 10a of Fig. 2. Another edge of each glass cloth 8, 9 and 10 likewise is turned outwardly to separate the coil end turn of different phases as at 10b of Fig. 1. Additionally, the outer tips 8c, 9c and 10c are folded over the outer periphery of the end turns and in overlapping relation as shown on the righthand side of Fig. 1. Because the cloth is then in a flexible condition, it closely follows the contour of the inner surface of the top and bottom coil sides which it separates, so that it is corrugated or dimpled, as indicated by the dotted lines 8d, 9d and 10d of Fig. 2, and permits the end turns of the coil 4 to nest between the end turns of adjacent coils in substantially as compact a manner as if the glass cloth were not installed.

After the initially impregnated glass cloth is inserted between the end turns of the various phases of the coil 4 and all of the coils are inserted in the winding slots 2 in any usual manner, the thermosetting resinous material with which the glass cloth is impregnated is then cured as, for example, by baking at 135° for approximately one-half hour to convert impregnated glass cloth into a rigid insulating brace substantially having the strength of iron. This curing of the resinous material may be accomplished simultaneously with the normal dipping and baking treatment of the completed stator winding.

In this finished state the overlapping portions of the glass cloth will be bonded together to strengthen the end turns by mutually reinforcing each other. More-over, because of the initially flexible nature of the glass cloth, it will be locked in position by the nesting of the coil end turns in the corrugations, as shown at 8d, 9d and 10d.

While the triangular shaped pieces of glass cloth 8, 9 and 10 are shown as being inserted between the three phases to support the coils at one end of the stator, it is obvious that they could likewise be applied in an identical manner to support the coil end turns at the opposite end of the stator. Additionally, it is within the scope of this invention to insert pieces of glass cloth between each adjacent coil end turn at each end of the stator rather than only between the coil end turns to separate coils of different phases of the stator winding.

Random wound stator coils braced in accordance with this invention, as illustrated in Fig. 1, have been tested and the radial deflection of the coil under high surge currents measured and compared with a random wound coil made without the bracing. It has been found that there is less than one-half of the radial deflection in the coils braced in accordance with this invention.

Referring now specifically to the modification shown in Fig. 2, there is shown additional means for reinforcing the stator end turns in the form of a plurality of strips of impregnated glass cloth 11 which are inserted in the winding slots between the top and bottom coil sides in the slots. By extending the strips of cloth 11 a predetermined distance, say 2", beyond the end of the stator punchings so that these strips overlap the edges of the reinforcing cloth 8, 9 and 10 at each end of the stator and will be bonded thereto upon the curing of the resinous material therein, means are provided for tying the corresponding pieces of glass cloth which are interleaved in the end turns at each end of the coil together to aid the corrugations 8d, 9d and 10d in locking the glass cloth in place. In other words, the insulating strips 11 and the pieces of glass cloth 8, 9 and 10 between the coils at both ends form an insulating reinforcing squirrel-cage construction supporting the coil end turns.

The impregnated glass cloth which has been used in the practice of this invention is a woven glass cloth, or glass mat, impregnated with the thermosetting resinous composition such as the combination of a high polymeric material, such as polyvinyl formal or other polyvinylal resins, and a heat reactive thermosetting polyester resin is used as the impregnating composition. By a high polymeric material is meant a resinous material of high molecular weight which is in its final state of polymerization or condensation, and which, upon being cast from solution, yields products of high tensile strength and toughness.

The use of a high polymeric solid material imparts toughness to the thermosetting resin which is usually brittle, and consequently results in a cloth which withstands the shocks, vibrations, and bending stresses encountered during use. Examples of such high polymeric materials and particularly polyvinylal resins, which may be used in the practice of this invention, may be found in U. S. Patent 2,307,588—Jackson et al. and Reissue Patent 20,430—Morrison et al., both of which are assigned to the assignee of the present invention.

The following impregnating composition has been found to be effective to accomplish the desired results: (1) a polymerizable unsaturated alkyd resin obtained by the esterification reaction of a mixture of ingredients comprising a polyhydric alcohol and an alpha unsaturated alpha-beta polycarboxylic acid, e. g., diethylene glycol maleate; (2) a copolymerizable different monomer, e. g., styrene, polyesters compatible with the above unsaturated alkyd resin obtained by esterification of allyl alcohol with a polybasic acid, specifically a polycarboxylic acid, e. g., diallyl phthalate, etc., in the ratio, by weight, of about 1 part to 1 to 3 parts of (1); (3) a catalyst for accelerating the copolymerization of the ingredients of (1) and (2), e. g., benzoyl peroxide; (4) a polyvinyl acetal resin, specifically a polyvinyl formal resin, in an amount corresponding to from 15 to 75 percent, by weight, of the total of (1), (2) and (4); (5) a volatile solvent for the ingredients of (1), (2) and (4), e. g. ethylene dichloride, a mixture of ethyl alcohol and 1-nitropropane, a mixture of ethyl alcohol and toluene, etc.; and (6) an inhibitor such as quinone or hydroquinone in an amount of approximately .001 percent to .01 percent of the weight of the reactive materials of (1) and (2). The amount of solvent to be used is between 5 and 20, preferably 10, times the amount of the polyvinyl formal resin in the composition.

While the glass cloth may be impregnated with this composition in any desired manner, it has been found to be preferable to dip the cloth in a bath containing the impregnating composition.

After the cloth has been dipped in the impregnating composition, it is preferably air dried for from 2½ to 2 hours at room temperature to evaporate the solvents therein so that the glass cloth is easy to handle and can be stored for an extended period of time.

From the foregoing it is apparent that this invention provides means for supporting the end turns of a random wound coil for the stator of a dynamoelectric machine by the use of an initially flexible impregnated glass cloth which is interleaved in the end turns of the winding and, upon curing, provides a reinforcing brace having substantially the strength of iron is locked in the interleaved position in the end turns.

While there is shown and described particular embodiments of this invention, further modifications and improvements thereof will occur to those skilled in the art. It is to be understood, therefore, that this invention is not limited to the particular forms shown and it is intended by the appended claims to cover all modifications which are within the spirit and scope of this invention.

What we claim as new and desire to secure by Letters Patent of the United States is:

1. A dynamoelectric machine comprising a stator having winding slots therein for receiving electrical coils for producing a magnetic flux in said stator, random wound coils comprising a plurality of turns of magnet wire having coil side portions selectively placed in layers in said slots and end turn portions projecting axially from the ends of said slots, a plurality of sheets of initially flexible glass cloth impregnated with a thermosetting resinous material placed between adjacent layers of said end turn portions and being arranged in a manner to contact a substantial length of said end turn portions and one another, and cured after assembly to provide rigid reinforcing means for restraining said end turns against movement.

2. A dynamoelectric machine comprising a stator having winding slots therein for the reception of electrical coils, random wound coils having coil side portions selectively placed in layers in said slots and end turn portions projecting from the ends thereof, an initially flexible glass cloth impregnated with a thermosetting resin interleaved between the layers of said end turn portions and being arranged to contact one another to provide a corrugated surface effective in preventing slippage of said end turn portions, and cured after assembly to provide a rigid brace to restrain said end turns against radial deflection.

3. A dynamoelectric machine comprising a stator having winding slots therein for the reception of electrical coils, random wound field coils having coil side portions selectively placed in layers in said slots and end turn portions projecting from the ends thereof, an initially flexible generally triangular-shaped glass cloth sheet impregnated with a thermosetting resin sandwiched and compressed between said end turns to provide portions conforming to the contour of the contacting surfaces of said end turns and baked after assembly to provide a rigid reinforcing brace for supporting the end turns against deflection under surge currents, said conforming portions serving to lock said cloth in said end turns and to prevent its relative movement with respect thereto.

4. A multiphase dynamoelectric machine comprising a stator having winding slots therein for the reception of a plurality of electrical coils for producing a field flux therein, said electrical coils having coil side portions selectively placed in layers in said slots and end turn portions projecting from the ends thereof, a plurality of pieces of initially flexible glass cloth impregnated with a thermosetting resinous material sandwiched between the end turns of adjacent coils of different phases and cured after assembly to provide a rigid reinforcing brace to restrain said end turns against movement, said pieces of glass cloth being constructed and arranged to provide overlapping portions adjacent the stator core and tips extending beyond the ends of said end turn portions folded back over the end of the end turn portions in an overlapping relationship so that the pieces of glass cloth between the three phases are bonded together upon the curing of the resinous material therein to mutually reinforce said end turn portions.

5. In a dynamoelectric machine having a stator with winding slots therein for the reception of electrical coils, random wound coils having portions positioned in layers in said slots and end turn portions projecting beyond each end thereof, an initially flexible piece of glass cloth impregnated with a thermosetting resin sandwiched between the top and bottom end turns at each end of said stator and being corrugated by the compacting of the end turns during assembly, a plurality of strips of initially flexible glass cloth impregnated with the thermosetting resin positioned in certain of said slots and extending beyond the ends thereof to overlap said glass cloth at each end of said stator, said impregnated cloth being cured after assembly to bond said strips to said pieces to provide a rigid reinforcing brace to support said end turns against radial deflection.

6. A dynamoelectric machine comprising a stator having winding slots therein for the reception of electrical coils to produce a magnetic flux in said stator, random wound coils having coil side portions selectively placed in layers in said slots and end turn portions projecting from each end thereof, a plurality of pieces of initially flexible glass cloth impregnated with a thermosetting resinous material placed between certain of the layers of said end turn portions at each end of said stator and being cured after assembly to provide rigid reinforcing braces to restrain the end turns against deflection, a plurality of strips of glass cloth impregnated with a thermosetting resinous material positioned in said winding slots and arranged to extend beyond the ends thereof to overlap said pieces of impregnated cloth and upon curing become integrally bonded thereto to form a rigid insulating squirrel-cage construction and thereby assist said pieces of impregnated cloth in reinforcing said end turns.

References Cited in the file of this patent

UNITED STATES PATENTS

| | | |
|---|---|---|
| 2,482,527 | Weil | Sept. 10, 1949 |
| 2,502,068 | Anderson | Mar. 28, 1950 |
| 2,594,693 | Smith | Apr. 29, 1952 |
| 2,602,829 | Fromm et al. | July 8, 1952 |